United States Patent [19]
Buschmann

[11] Patent Number: 5,100,210
[45] Date of Patent: Mar. 31, 1992

[54] PROCESS OF AND APPARATUS FOR CONTROLLLING AN ANTI-LOCKING HYDRAULIC BRAKE SYSTEM

[75] Inventor: Gunther Buschmann, Griesheim, Fed. Rep. of Germany

[73] Assignee: Alfred Teves GmbH, Frankfurt am Main, Fed. Rep. of Germany

[21] Appl. No.: 270,758

[22] Filed: Nov. 14, 1988

[30] Foreign Application Priority Data

Dec. 12, 1987 [DE] Fed. Rep. of Germany ....... 3742172

[51] Int. Cl.$^5$ .............................................. B60F 15/00
[52] U.S. Cl. ................................................ 303/113 SS
[58] Field of Search ............ 303/61, 91, 93, 100, 303/103, 110, 116, 119, 113 SS; 188/181 A, 181 C, 181 R; 60/545, 548, 552; 364/426.02

[56] References Cited

U.S. PATENT DOCUMENTS

| | | | |
|---|---|---|---|
| 3,637,264 | 1/1972 | Leiber et al. | 303/61 X |
| 3,698,772 | 10/1972 | Nixon | 303/61 X |
| 4,131,325 | 12/1978 | Bayliss | 188/181 C X |
| 4,640,557 | 2/1987 | Panizza et al. | 303/100 |
| 4,775,196 | 10/1988 | Braschel et al. | 303/115 |
| 4,803,840 | 2/1989 | Seibert et al. | 60/545 |

FOREIGN PATENT DOCUMENTS

| | | | |
|---|---|---|---|
| 1385638 | 2/1975 | United Kingdom | 303/100 |
| 2111622 | 7/1983 | United Kingdom . | |
| 2197402 | 5/1988 | United Kingdom . | |

Primary Examiner—Matthew C. Graham
Attorney, Agent, or Firm—Robert P. Seitter; J. Gordon Lewis

[57] ABSTRACT

An anti-locking hydraulic brake system is provided, having a master brake cylinder, a pump, at least one wheel brake cylinder and a reservoir. Inlet and outlet valves are controlled to determine the rate of flow through sections of the pressure conduits. By influencing the rate of flow, a corresponding passage flow is supplied to or discharged from the master brake cylinder and the wheel brake cylinder, respectively, thereby permitting positioning of the master brake cylinder piston and control of the wheel rotating pattern.

13 Claims, 1 Drawing Sheet

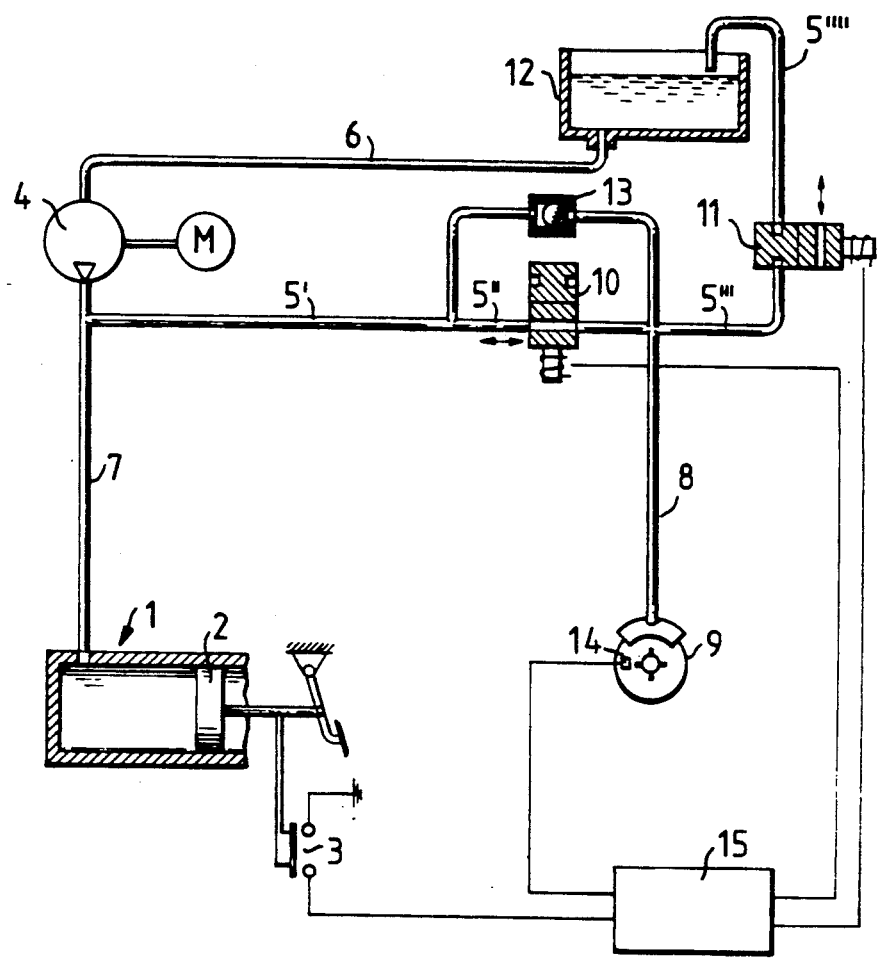

PROCESS OF AND APPARATUS FOR CONTROLLLING AN ANTI-LOCKING HYDRAULIC BRAKE SYSTEM

BACKGROUND OF THE INVENTION

The present invention relates to an anti-locking hydraulic brake system. A brake system of this type is disclosed, for example, in German Published Patent Application No. 36 01 914, of which U.S. Pat. No. 4,803,840 is a counterpart.

German Published Patent Application (DE-OS) No. 36 01 914 discloses that during non-controlled decelerations, the pump is turned off, the inlet valve opened and the outlet valve closed. Pressure fluid communicates between the master cylinder and the wheel brake cylinders. The brake is applied by stepping on the pedal thereby causing pressure to build up in the master brake cylinder, propagating, through the brake conduits, into the wheel brake cylinders.

For brake skid control purposes, the pump is switched on, such that pressure fluid is transported from the reservoir into the pressure conduits. The pressure fluid is passed from the pressure conduits into both the master brake cylinder and the wheel brake cylinders. By opening and closing the inlet and outlet valves in accordance with a predetermined control pattern, the pressure in the wheel brake cylinders is varied irrespective of the pressure in the master brake cylinder. The pressure fluid that has passed into the master brake cylinder causes the working piston of the master brake cylinder to be returned to its initial position. Once it has reached that position, the central valves open to return excess pressure fluid volume to the reservoir.

The afore-described system, admittedly, has the advantage that efforts, in terms of valves, are low; however, conversely, it exhibits the disadvantage that the working piston of the master brake cylinder and, hence, the pedal, during brake skid control, is completely restored.

According to an alternative solution, German Published Patent Application (DE-OS) No. 35 27 190, of which U.S. Pat. No. 4,750,788 is a counterpart, discloses hydraulically blocking the master brake cylinder during brake skid control thereby causing the master cylinder piston to remain in the same position upon commencement of the brake skid control. The master cylinder pressure is fed as a control pressure to a control valve adjusting the pressure in the pump circuit in response to the master cylinder pressure. In this embodiment, the pedal, admittedly, is not restored, however, substantial efforts in terms of valves are required, namely an additional blocking valve and an additional control valve. Moreover, it is not reliably safeguarded such that in the event of a pump failure an adequate reserve volume is available in the master brake cylinder sufficient for emergency deceleration.

SUMMARY OF THE INVENTION

It is, therefore, an object of the present invention to control a conventional anti-locking hydraulic brake system such that a reserve volume is available without the master cylinder piston being restored completely.

This object of the present invention is accomplished by recording the position of the master cylinder piston, operating the inlet valve in response to the working piston position, and operating the outlet valve in response to the rotational pattern of the associated wheel relative to the inlet valve. Particularly advantageous is the configuration of the valves as 2-way/2-position valves operated in electromechanical fashion.

The rate of flow through a valve of this type may be determined by the sequence of the closed time period and opened time period, with two alternatives being available: the closed time period and the opened time period of the valves either follow at uniform intervals, with the rate of flow determined by the cyclical frequency; or the opened time to closed time ratio is varied thereby influencing the rate of flow.

Both the positioning of the working piston of the master cylinder and the control of brake pressure in the wheel brake cylinders are effected as described hereafter.

When brake skid control is required, the pump delivers fluid pressure from the reservoir into the pressure conduit. The pump supplies a predetermined flow Q. The rate of flow through the inlet valve is adjusted to be larger or smaller than the flow Q or to correspond thereto. If the rate of flow exceeds the flow Q of the pump, additional pressure fluid volume is discharged from the master brake cylinder thereby further displacing the working piston, attaining a reduction in the master cylinder volume which displaces the pedal in the actuating direction. If the rate of flow through the inlet valve is smaller than the flow Q of the pump, pressure fluid is supplied to the master brake cylinder so that the working piston will be displaced in the sense of an enlargement of the master cylinder volume which restores the pedal. Through changing the rate of flow through the inlet valve, the working piston can thus be randomly positioned. As the position of the working piston can be detected by means of a sensor, the position of the working piston is controllable.

The pressure fluid flow beyond the inlet valve is determined by the inlet rate of flow. The rate of flow of the outlet valve can now be adjusted to the rate of flow of the inlet valve. Once the outlet rate of flow is in excess of the inlet rate of flow, pressure fluid will be discharged from the wheel brake cylinders to thereby remove brake pressure from the wheel. When the rate of flow of the outlet valve is less than that of the inlet valve, pressure fluid will be supplied to the wheel brake cylinder thereby increasing the brake pressure.

To position the master cylinder piston, the rate of flow through the valves is uniformly varied if the ratios in the wheel brake cylinder are to remain unchanged. The relative change in the rates of flow of the inlet and outlet valves with respect to one another determines the brake pressure application to the wheel brake cylinder. The brake pressure application is connected with a change in the rotating speed of the wheel. The rotating speed of the wheel can be recorded so that control can be effected.

As a result of this method of operating the inlet and outlet valves, on the one hand, the master cylinder piston can be positioned and, on the other hand, an optimum brake pressure is adjustable on the wheels.

The positioning can be so effected that an adequate reserve volume is available.

BRIEF DESCRIPTION OF THE DRAWINGS

The function and further advantages of the present invention will become apparent from the following Detailed Description of the Preferred Embodiment of the invention and the drawing, which shows a schematic depiction of an anti-locking hydraulic brake system and control according to the present invention.

DETAILED DESCRIPTION OF A PREFERRED EMBODIMENT

The principle of the invention is illustrated with reference to the sketch as shown in the drawing. The brake system comprises a master brake cylinder 1 including a working piston 2 actuated by a schematically shown pedal. Connected to the working piston 2 and to the pedal, respectively, is a way-switch 3 which detects whether the piston is in a predetermined position. The switch can also be configured as a way-meter thereby producing an analogous signal indicative of the position of the master cylinder piston 2. Moreover, a pump 4 is driven by a motor M. The pump delivers into a pressure conduit 5 comprising sections 5' through 5''''. The pressure fluid is discharged from the reservoir 12 through a suction conduit 6.

Connected into the pressure conduit 5 are an inlet valve 10 and an outlet valve 11 that are electromagnetically operated. In their basic position, the inlet valve 10 is opened and the outlet valve 11 is closed.

Immediately behind the pump, a conduit 7 branches off toward the master brake cylinder. Between the valves, a conduit 8 branches off toward the wheel brake cylinder 9. Connected in parallel to the inlet valve 10 is a check valve 13 opening toward the pump 4 and toward the master brake cylinder 1, respectively.

The rotating pattern of the wheel to be decelerated can be recorded by a sensor 14. The sensor signal, through a control conduit, is supplied to a controller 15. The measuring signal of the way-switch 3 is also supplied to the controller. The controller comprises electronic circuits which, on the basis of a predetermined pattern, generate signals for the inlet and outlet valves 10, 11.

In the absence of brake skid control, the valves are in the switch conditions as shown. The pump 4 is not actuated. There is a pressure fluid connection, through conduit 7, a section of the pressure conduit 5 and the conduit 8, between the master brake cylinder 1 and the wheel brake cylinder 9. Through actuation of the pedal, the master cylinder piston 2, in the illustration of the sketch, is displaced to the left, thereby reducing the master cylinder volume and developing a pressure. The pressure propagates, through the conduit sections as described, to the wheel brake cylinder.

If the controller now detects that the wheel to be decelerated tends to lock, first the outlet valve 11 is opened and the inlet valve 10 is closed so that pressure fluid can escape from the wheel brake cylinder 9, through the conduit 8 and the pressure conduit sections 5''' and 5'''', into the reservoir 12. At the same time, the pump starts to deliver pressure fluid into the master brake cylinder due to the closed inlet valve 10. The master brake cylinder is restored until a position has been reached in which the way-switch 3 responds. Now, the valve 10 opens to the extent that the entire pressure fluid volume from the pump 4, through the valve 10, is passed into the conduit section 5'''. The master cylinder piston will remain in its position as no pressure fluid is supplied to the master brake cylinder nor is it discharged therefrom. The pressure fluid volume passed into the branch conduit 5''', depending on the adjustment of the rate of flow of the valve 10 in relation to the rate of flow of the valve 11, either is passed in full into the reservoir such that the pressure in the wheel brake cylinder remains unchanged, or is passed, in part, into the wheel brake cylinder resulting in a pressure increase.

When the rate of flow of the valve 11 is adjusted higher than that of valve 10, pressure fluid is additionally discharged from the wheel brake cylinder so that the wheel brake cylinder is pressure-relieved. The pressure in the wheel brake cylinder, hence, can be determined by harmonizing the rates of flow of the inlet and outlet valves.

When operating the valves, it should be noted that opening and closure processes should be effected approximately at the same time to thereby avoid as far as possible, pressure fluctuations caused by non-harmonized behavior of the valves.

The check valve 13 serves to restrict the pressure in the wheel brake cylinder 9 to the pressure in the master brake cylinder thereby enabling the driver to terminate the control operation. For, if the driver relieves the master brake cylinder 1, the pressure in the wheel brake 9 is lowered so that the wheel no longer tends to lock.

The operation of the system will now be explained. The pump 4 delivers into an open circuit of the pressure conduit 5, into a reservoir 12 and into the suction conduit 6. The valves provided in the pressure conduits determine the rate of flow, with conduits leading to pressure transmitters and pressure receivers branching off through branch lines. The rates of flow of the valves determine whether pressure fluid is to be supplied to or discharged from the pressure transmitters and pressure receivers, respectively.

The afore-described principle of the invention can be readily transferred to a multiple-circuit brake system thereby requiring corresponding parallel branches leading to the pressure conduit 5, and additional valves provided between the branch points. Also, the control values can be varying in size. In the embodiment shown this, on the one hand, refers to the pedal position and to the master cylinder piston position, respectively and, on the other hand, to the skid of the wheel to be decelerated. In other hydraulic systems, for example, the pressure or other parameters derivable from the effect of the aggregate can be referred to as the control values. Such alternatives need not be described in any greater detail since one skilled in the art is readily aware thereof.

What is claimed is:

1. A process of controlling an anti-locking hydraulic brake system for use with an automotive vehicle, the system including a hydraulic pump, a reservoir, a pressure conduit, and a suction line, forming an open pressure fluid circuit, a master brake cylinder and at least one wheel brake cylinder in communication with the pressure fluid conduit through branch lines, an outlet valve in the pressure conduit immediately ahead of the reservoir, and an inlet valve in the pressure conduit between the branch lines to the master cylinder and the wheel cylinder, and a sensor for detecting a wheel rotating pattern, said process comprising the steps of:

sensing a position of a master cylinder working piston;

operating the inlet valve in response to the working piston position sensed; and operating the outlet valve relative to the inlet valve in response to the rotating pattern of an associated wheel.

2. The process according to claim 1, further comprising the step of electromechanically operating the inlet and outlet valves, wherein the inlet and outlet valves are electromechanically operated 2-way/2-position valves.

3. The process according to claim 2, further comprising the step of controlling a rate of flow through the inlet and outlet valves by a sequence of opening and closing signals.

4. A process of controlling an anti-locking hydraulic brake system for use with an automotive vehicle, the system including a hydraulic pump, a reservoir, a pressure conduit, and a suction line, forming an open pressure fluid circuit, a master cylinder having a working piston and at least one wheel brake cylinder in communication with the pressure fluid conduit immediately ahead of the reservoir, and an inlet valve in the pressure conduit between the branch lines to the master cylinder and the wheel cylinder, and a sensor for detecting a wheel rotating pattern, said process comprising the steps of:

sensing a first position of the master cylinder working piston as it moves in a first direction in response to the application of a brake pedal to which the master cylinder working piston is coupled;

sensing from the wheel rotation pattern a locked wheel condition;

closing the inlet valve and activating the hydraulic pump in response to the first working piston position sensed and the locked wheel condition sensed to apply pressure fluid to the master cylinder to move the master cylinder working piston in a second direction opposite to the first direction;

sensing a second position of the master cylinder working piston as it moves in the second direction;

opening the inlet valve in response to the second working piston position sensed; and alternately and sequentially opening and closing the inlet valve and the outlet valve in response to the wheel rotation pattern until the locked wheel condition ends.

5. The process according to claim 4, further comprising the step of electromechanically operating the inlet and outlet valves, wherein the inlet and outlet valves are electromechanically operated 2-way/2-position valves.

6. The process according to claim 5, further comprising the step of controlling a rate of flow through the inlet and outlet valves by a sequence of opening and closing signals.

7. The process according to claim 6, further comprising the step of varying a cyclical frequency of the sequence of opening and closing signals at uniform intervals to control the rate of flow.

8. The process according to claim 7, further comprising the step of varying an opened time to closed time ratio of the sequence of opening and closing signals at varying intervals to control the rate of flow.

9. An anti-locking hydraulic brake system for use with an automotive vehicle, said system comprising;

an open pressure fluid circuit including:
        (a) a reservoir for pressure fluid,
        (b) a hydraulic pump,
        (c) a first pressure conduit for conducting pressure fluid from said reservoir to said hydraulic pump, and
        (d) a second pressure conduit for conducting pressure fluid from said hydraulic pump to said reservoir, a normally open inlet valve in said second pressure conduit;

a normally closed outlet valve in said second pressure conduit downstream from said inlet valve;

a master brake cylinder having a working piston;

a first branch pressure conduit connected into said second pressure conduit between said hydraulic pump and said inlet valve for conducting pressure fluid between said second pressure conduit and said master brake cylinder;

a wheel brake cylinder;

a second branch pressure conduit connected into said second pressure conduit between said inlet valve and said outlet valve for conducting pressure fluid between said second pressure conduit and said wheel brake cylinder;

first sensing means for sensing movement of said working piston to:
        (a) a first position in response to the application of a brake pedal to which said working piston is coupled, and
        (b) a second position in response to the application of pressure fluid;

second sensing means responsive to a wheel rotation pattern for sensing a locked wheel condition;

and control means responsive to said first sensing means and said second sensing means for:
        (a) closing said inlet valve and opening said outlet valve when said first working piston position and said locked wheel condition are sensed,
        (b) activating said hydraulic pump when said first working piston position and said locked wheel condition are sensed,
        (c) opening said inlet valve when said second working piston position is sensed, and
        (d) operating said inlet valve and said outlet valve to regulate pressure fluid flow between said second pressure conduit and said wheel brake cylinder until the locked wheel condition ends.

10. An anti-locking hydraulic brake system according to claim 9 wherein said inlet valve and said outlet valve are alternately and sequentially opened and closed to regulate pressure fluid flow between said second pressure conduit and said wheel brake cylinder until the locked wheel condition ends.

11. An anti-locking hydraulic brake system according to claim 10 wherein said inlet valve and said outlet valve are electromechanically operated 2-way/2-position valves.

12. A process of controlling an anti-locking hydraulic brake system for use with an automotive vehicle, the system including a hydraulic pump, a reservoir, a pressure fluid conduit, and a suction line, forming an open pressure fluid circuit, a master brake cylinder and at least one wheel brake cylinder in communication with the pressure fluid conduit through branch lines, an electromagnetically operated 2-way/2-position outlet valve in the pressure fluid conduit immediately ahead of the reservoir, an electromagnetically operated 2-way/2-position inlet valve in the pressure fluid conduit between the branch lines to the master cylinder and the wheel cylinder, and a sensor for detecting a wheel rotating pattern, said process comprising the steps of:

sensing a position of a master cylinder working piston;

electromagnetically operating the inlet valve in response to the working piston position sensed;

electromagnetically operating the outlet valve relative to the inlet valve in response to the rotating pattern of an associated wheel;

controlling a rate of flow through the inlet and outlet valves by a sequence of opening and closing signals; and varying a cyclical frequency of the sequence of opening and closing signals at uniform intervals to control the rate of flow.

13. A process of controlling an anti-locking hydraulic brake system for use with an automotive vehicle, the system including a hydraulic pump, a reservoir, a pressure fluid conduit, and a suction line, forming an open pressure fluid circuit, a master brake cylinder and at least one wheel brake cylinder in communication with the pressure fluid conduit through branch lines, an electromagnetically operated 2-way/2-position outlet valve in the pressure fluid conduit immediately ahead of the reservoir, an electromagnetically operated 2-way/2-position inlet valve in the pressure fluid conduit between the branch lines to the master cylinder and the wheel cylinder, and a sensor for detecting a wheel rotating pattern, said process comprising the steps of:

sensing a position of a master cylinder working piston;

electromagnetically operating the inlet valve in response to the working piston position sensed;

electromagnetically operating the outlet valve relative to the inlet valve in response to the rotating pattern of an associated wheel;

controlling a rate of flow through the inlet and outlet valves by a sequence of opening and closing signals; and varying an opened time to closed time ratio of the sequence of opening and closing signals at varying intervals to control the rate of flow.

* * * * *